(12) United States Patent
Scalzi et al.

(10) Patent No.: US 9,126,245 B2
(45) Date of Patent: Sep. 8, 2015

(54) CHEMICAL OXIDATION AND BIOLOGICAL ATTENUATION PROCESS FOR THE TREATMENT OF CONTAMINATED MEDIA

(71) Applicant: Innovative Environmental Technologies, Inc., Pipersville, PA (US)

(72) Inventors: Michael Scalzi, Doylestown, PA (US); Antonis Karachalios, North Wales, PA (US)

(73) Assignee: Innovative Environmental Technologies, Inc., Pipersville, PA (US)

( * ) Notice: Subject to any disclaimer, the term of this patent is extended or adjusted under 35 U.S.C. 154(b) by 113 days.

(21) Appl. No.: 13/891,934

(22) Filed: May 10, 2013

(65) Prior Publication Data

US 2014/0335601 A1 Nov. 13, 2014

(51) Int. Cl.
| | | |
|---|---|---|
| *B09C 1/10* | (2006.01) | |
| *C02F 3/00* | (2006.01) | |
| *C02F 1/52* | (2006.01) | |
| *C02F 1/72* | (2006.01) | |
| *C02F 3/28* | (2006.01) | |
| *B09C 1/08* | (2006.01) | |
| *C02F 101/30* | (2006.01) | |
| *C02F 101/32* | (2006.01) | |
| *C02F 101/34* | (2006.01) | |
| *C02F 101/36* | (2006.01) | |
| *C02F 103/06* | (2006.01) | |

(52) U.S. Cl.
CPC ... *B09C 1/10* (2013.01); *B09C 1/08* (2013.01); *C02F 1/5245* (2013.01); *C02F 1/722* (2013.01); *C02F 3/006* (2013.01); *C02F 3/28* (2013.01); *C02F 2101/30* (2013.01); *C02F 2101/306* (2013.01); *C02F 2101/322* (2013.01); *C02F 2101/327* (2013.01); *C02F 2101/34* (2013.01); *C02F 2101/36* (2013.01); *C02F 2101/363* (2013.01); *C02F 2103/06* (2013.01); *Y02W 10/12* (2015.05)

(58) Field of Classification Search
None
See application file for complete search history.

(56) References Cited

U.S. PATENT DOCUMENTS

| | | | | |
|---|---|---|---|---|
| 6,726,406 B2 * | 4/2004 | Gilmore et al. | ............ | 405/128.5 |
| 7,576,254 B2 * | 8/2009 | Block et al. | ................... | 588/320 |

FOREIGN PATENT DOCUMENTS

WO WO9905689 11/1999

OTHER PUBLICATIONS

Lucas, Marcel; et al; "Evidence for room temperature delignification of wood using hydrogen peroxide and manganese acetate as a catalyst" Bioresource Technology, 119, 174-180, 2012.*
Chen, Ge; et al; "The mechanism and applicability of in situ oxidation of trichloroethylene with Fenton's reagent" Journal of Hazardous Materials, B87, 171-186, 2001.*
Davis, John W; et al; "Natural Biological Attenuation of Benzene in Ground Water Beneath a Manufacturing Faciility" Ground Water, 32, 215-226, 1994.*
Block, "Novel Activation Technologies for Sodium Persulfate in Situ Chemical Oxidation", Proceeding of the Fourth International Conference on the Remediation of Chlorinated and Recalcitrant Compounds, 2004.
Innovative Environmental Technologies, Inc., "Zero Valent Iron Catalyzed Hydroxyl & Sulfate Free Radical Oxidation", PA, 2008.
Taylor, Kevin M., "The Chemical Oxidation of Polycyclic Aromatic Hydrocarbons at a Former Manufactured Gas Plant in Bay Shore, New York", Stony Brook University, 2012.

* cited by examiner

*Primary Examiner* — Blaine Lankford
*Assistant Examiner* — David Berke-Schlessel
(74) *Attorney, Agent, or Firm* — Douglas J. Ryder; Ryder, Lu, Mazzeo & Konieczny LLC

(57) ABSTRACT

A method for the removal of semi-volatile organic compounds in soils, sludges, groundwater, process water, and wastewater is presented. Oxidation and biological attenuation processes utilize persulfates and other oxidants with trivalent metals, such as ferrous iron or $Mn^{3+}$, as activators. The resulting chemical oxidation process yields degradation compounds which facilitate further attenuation via biological processes.

26 Claims, No Drawings

CHEMICAL OXIDATION AND BIOLOGICAL ATTENUATION PROCESS FOR THE TREATMENT OF CONTAMINATED MEDIA

FIELD OF INVENTION

The present invention relates to the in-situ and ex-situ oxidation of organic compounds in soils, sludges, groundwater, process water, and wastewater. More specifically, the present invention relates to the oxidation and biological attenuation of volatile and semi-volatile organic compounds, pesticides and herbicides, and other recalcitrant organic compounds in soil and groundwater using trivalent metal activated persulfate.

BACKGROUND OF THE INVENTION

Current oxidation technologies using activated persulfate are specifically associated with applications for the treatment of organic contaminants in soils and groundwater and are limited to activation technologies using divalent iron, UV, heat, carbonate, and liquid (hydrogen) peroxide. The use of chelated divalent metal complexes prevents the second and critical step in the remedial process which is biologically mediated. These technologies are effective for the full range of organics within the saturated zone; however, each activation process targets a specific organic range of contaminants. The incorporation of a biological component in the remedial process allows for a single treatment as compared to other persulfate activation processes which requires additional oxidation events to fully treat the sorbed phases of the targeted compounds.

Chlorinated solvents and petroleum hydrocarbons, including polyaromatic hydrocarbons are compounds characterized by their toxicity to organisms at higher concentrations and are widely distributed in oil contaminated soils and groundwater.

Halogenated volatile organic compounds (VOCs), including chlorinated aliphatic hydrocarbons (CAHs), are the most frequently occurring type of contaminant in soil and groundwater at Superfund and other hazardous waste sites in the United States. The U.S. Environmental Protection Agency (EPA) estimates that cleanup of these sites will cost more than $45 billion (1996) over the next several decades.

CAHs are manmade organic compounds. They typically are manufactured from naturally occurring hydrocarbon constituents (methane, ethane, and ethene) and chlorine through various processes that substitute one or more hydrogen atoms with a chlorine atom, or selectively dechlorinate chlorinated compounds to a less chlorinated state. CAHs are used in a wide variety of applications, including uses as solvents and degreasers and in the manufacturing of raw materials. CAHs include such solvents as tetrachloroethene (PCE), trichloroethene (TCE), carbon tetrachloride (CT), chloroform (CF), and methylene chloride (MC). Historical management of wastes containing CAHs has resulted in contamination of soil and groundwater, with CAHs present at many contaminated groundwater sites in the United States. TCE is the most prevalent of those contaminants. In addition, CAHs and their degradation products, including dichloroethane (DCA), dichloroethene (DCE), and vinyl chloride (VC), tend to persist in the subsurface creating a hazard to public health and the environment.

Benzene, toluene, ethylbenzene, and xylenes (BTEX) are characterized by their toxicity to organisms at higher concentrations, and are widely distributed in oil contaminated soils, groundwater, and sediments as a result of relatively high aqueous solubility compared to other components of petroleum. As the United States Environmental Protection Agency (U.S. EPA) estimates, 35% of the U.S.'s gasoline and diesel fuel underground storage tanks (USTs) are leaking and approximately 40% of these leaking USTs likely have resulted in soil and groundwater contaminations from BTEX. BTEX are volatile and water-soluble constituents that comprise 50% of the water-soluble fraction of gasoline. The presence of BTEX in groundwater can create a hazard to public health and the environment.

BTEX are readily degradable in aerobic surface water and soil systems; however, in the subsurface environment, contamination by organic compounds often results in the complete consumption of available oxygen by indigenous microorganisms and the development of anaerobic conditions. In the absence of oxygen, degradation of BTEX can take place only with the use of alternative electron acceptors, such as nitrate, sulfate, or ferric iron, or fermentatively in combination with methanogenesis.

Polychlorinated biphenyls (PCBs) are organochlorine compounds which are mixtures of up to 209 individual chlorinated compounds referred to as congeners. These congener mixtures of chlorobiphenyl (the base chemical) are referred to by different identification systems.

PCBs have been commercially produced and sold as pure oil or in equivalent form from around 1929. They are extremely stable compounds with excellent electrical insulation and heat transfer properties. These characteristics have led to their widespread use in a variety of industrial, commercial and domestic applications.

PCBs can be released to the environment from hazardous waste sites; illegal or improper disposal of industrial wastes and consumer products; leaks from old electrical transformers containing PCBs; also incinerating some wastes. Their major disadvantage is that they do not readily break down in the environment and thus may remain there for very long periods of time. They can travel long distances in the air and be deposited in areas far away from where they were released.

While water contamination can occur, many PCBs dissolve or stick to the bottom sediments or attach themselves to organic particles. Similarly, PCBs can be easily attached to soil particles. They can also be absorbed by small organisms and fish and through the food chain can travel to other animals. PCBs accumulate in fish and marine mammals, reaching levels that may be many thousands of times higher than in water.

The U.S. EPA has established permissible levels for chemical contaminants in drinking water supplied by public water systems. These levels are called Maximum Contaminant Levels (MCLs). To derive these MCLs, the U.S. EPA uses a number of conservative assumptions, thereby ensuring adequate protection of the public. In the case of known or suspected carcinogens, such as benzene or PCE, the MCL is calculated based on assumption that the average adult weighs 154 lbs and drinks approximately 2 quarts of water per day over a lifetime (70 years). The MCL is set so that a lifetime exposure to the contaminant at the MCL concentration would result in no more than 1 to 100 (depending on the chemical) excess cases of cancer per million people exposed. The table below outlines the MCL figures for BTEX.

| Chemical Compound | MCL Chemical (µg/L) |
| --- | --- |
| PCE | 5 |
| TCE | 5 |
| Chlorobenzene | 100 |
| PCBs | 0.5 |

| Chemical Compound | MCL Chemical (μg/L) |
|---|---|
| Benzene | 5 |
| Toluene | 1,000 |
| Ethylbenzene | 700 |
| Xylenes (total) | 10,000 |

Therefore, there is a need in the art for a process of oxidation and biological attenuation of volatile and semi-volatile organic compounds, pesticides and herbicides, and other recalcitrant organic compounds in soils, sediments, clays, rocks, sands, groundwater, and all other environmental media.

SUMMARY OF THE INVENTION

In order to solve the need in the art for a process of oxidation and biological attenuation of volatile and semi-volatile organic compounds, pesticides and herbicides, and other recalcitrant organic compounds in soils, sediments, clays, rocks, sands, groundwater, and all other environmental media, the present invention was devised.

The use of in-situ or introduced metals in the trivalent state as the activation chemical allows for application of the activation chemical, either concurrently or sequentially, with the persulfate and provides for both the desired activation of the persulfate and the controlled reaction within the targeted treatment zone without migration. The contaminants that can be effectively treated with this technology include, but are not limited to, petrochemicals, chlorinated organics, pesticides, energetics, and perchlorates.

The present invention is a method for the treatment of contaminated soils, sediments, clays, rocks, sands and the like (hereinafter collectively referred to as "soils") containing organic contaminants, including but not limited to volatile organic compounds, semi-volatile organic compounds, non-volatile organic compounds, pesticides and herbicides. The present invention also provides for the treatment of contaminated groundwater (i.e. water found underground in cracks and spaces in soil, sand and rocks), process water (i.e. water resulting from various industrial processes) or wastewater (i.e. water containing domestic or industrial waste, often referred to as sewage) containing these compounds.

Contaminants susceptible to treatment by the compositions of the present invention notably include various man-made and naturally occurring volatile hydrocarbons including chlorinated hydrocarbons and non chlorinated hydrocarbons, aromatic or polyaromatic ring compounds, brominated compounds, propellants or explosives, and so forth. Examples of chlorinated hydrocarbons are volatile organic compounds such as chlorinated olefins including PCE, TCE, cis-1,2-dichloroethane and vinyl chloride, but also non-volatile organic compounds such as PCBs or dichlorobenzene. Usual non chlorinated compounds include total petroleum hydrocarbons (TPHs) including benzene, toluene, xylene, methyl benzene and ethylbenzene, but also methyl tert-butyl ether (MTBE), tert-butyl alcohol (TBA) or polyaromatic hydrocarbons (PAHs) such as naphthalene. Further examples of contaminants susceptible to treatment by the composition of the present invention are brominated solvents, 1,4-dioxane, insecticides, etc. An example of an explosive is nitroaniline trinitrotoluene.

The present invention uses ferric iron ($Fe^{3+}$) to activate a system of peroxide and/or persulfate in order to chemically oxidize the targeting contaminants and eventually lead to their chemical attenuation. The source of the ferric iron may be indigenous divalent iron (ferrous) or other related introduced iron species including zero valent iron and associated zero valent metals. Hydrogen peroxide or another oxidant is introduced into the media wishing to be treated, converting the indigenous or introduced metallic species to trivalent metal ions. In alternate embodiments, other trivalent metal ions such as manganese ($Mn^{3+}$) may be used.

The resulting activated persulfate reaction effectively oxidizes the targeted contaminant(s) while providing for sequential biological attenuation by-way of facultative processes which utilize the resulting sulfate and ferric iron as terminal electron acceptors. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS

Hydrogen peroxide ($H_2O_2$) has been used as a chemical reagent to remove chlorinated solvents and petroleum contaminants from soils and groundwater. Alone it is an oxidant, but at low concentrations (<0.1%) it is not kinetically fast enough to degrade many hazardous organic contaminants before decomposition occurs. The addition of metals dramatically increases the oxidative strength of peroxide. This increase is attributed to the production of hydroxyl radicals (OH.). In addition, a chain reaction is initiated, causing the formation of new free radicals. Free radicals are molecular fragments that have an unpaired electron, causing them to be highly reactive and short-lived. The hydroxyl ions are very powerful oxidizers, and react particularly well with organic compounds. The hydroxyl radicals break the chlorinated and petroleum hydrocarbon bonds of common petroleum constituents such as PCE and BTEX, as well as petroleum aromatic PAHs and MTBE.

In one embodiment the remedial materials are introduced to the targeted environmental medium via temporary or permanent wells, and can be accomplished by gravity feeding, induced gas streams, pumps, or by a combination of these systems. Depending on the situation, introducing the remedial materials into an open excavation prior to backfilling may also be preferred. In another embodiment the introduction may be accomplished via a gas or liquid stream if the situation dictates.

In the presence of $H_2O_2$, zero valent iron ($Fe^0$) is initially transformed into ferrous iron ($Fe^{2+}$) as seen in equation (1). Ferrous iron then reacts with $H_2O_2$ in traditional Fenton's oxidation reactions to form ferric iron ($Fe^{3+}$) as seen in equation (2):

$$H_2O_2 + Fe^0 \rightarrow Fe^{2+} + OH^- + OH. \tag{1}$$

$$H_2O_2 + Fe^{2+} \rightarrow Fe^{3+} + OH^- + OH. \tag{2}$$

Hydroxyl radicals are very strong oxidizing agents. A chain-propagating sequence usually takes place, which can also generate superoxide ions ($O_2^-$.), hydroperoxide ions ($HO_2^-$), and organic radicals (R.). Reactions involving radicals are either chain-propagating or chain-terminating reactions. Equations 1 and 2 are examples of chain-initiating reactions because initial hydroxyl radicals are formed. Other examples of radical reactions involving hydrogen peroxide are outlined below in equations (3) through (8).

Chain Reactions:

$$H_2O_2 + OH\cdot \rightarrow H_2O + HO_2\cdot \quad (3)$$

$$HO_2\cdot \rightarrow O_2^-\cdot + H^+ \quad (4)$$

$$OH\cdot + RH \rightarrow R\cdot + OH^- \quad (5)$$

$$H_2O_2 + R\cdot \rightarrow ROH + OH\cdot \quad (6)$$

$$HO_2\cdot + Fe^{2+} \rightarrow Fe^{3+} + H^+ + O_2 \quad (7)$$

$$HO_2\cdot + Fe^{2+} \rightarrow Fe^{3+} + HO_2^- \quad (8)$$

When hydrogen peroxide is present in excess, many more radicals are produced. In addition to the reactions that occur between the oxidant and the organics present, radical-propagating reactions also occur involving the excess $H_2O_2$. Therefore, there are more radicals available to react with the contamination. In almost all cases, the intermediates that are produced in these reactions are more biodegradable when compared to the parent compound.

Persulfates (specifically dipersulfates) are strong oxidants that have been widely used in many industries for initiating emulsion polymerization reactions, clarifying swimming pools, hair bleaching, micro-etching of copper printed circuit boards, and TOC analysis. In the last few years there has been increasing interest in sodium persulfate as an oxidant for the destruction of a broad range of soil and groundwater contaminants. Persulfates are typically manufactured as the sodium, potassium, and ammonium salts. The sodium form is the most commonly used for environmental applications. The persulfate anion is the most powerful oxidant of the peroxygen family of compounds and one of the strongest oxidants used in remediation. The standard oxidation-reduction potential for the reaction is 2.1 V, as compared to 1.8 V for hydrogen peroxide (Block et al, 2004).

$$S_2O_8^{2-} + 2H^+ + 2e^- \rightarrow 2HSO_4^- \quad (9)$$

In addition to direct oxidation, sodium persulfate can be activated through the presence of ferric iron (or related trivalent metal) in order to form sulfate radicals, thereby providing free radical reaction mechanisms similar to the hydroxyl radical pathways generated by Fenton's chemistry.

$$S_2O_8^{2-} \rightarrow 2SO_4^-\cdot \quad (10)$$

Persulfate activation with ferric iron requires a lower activation energy than thermal activation, which makes iron activated persulfate a more efficient and rapid way of degrading contaminants. The reactions that occur in the chemical oxidation can be seen in equations (11) through (17) below:

Oxidation Chain Reactions:

$$S_2O_8^{2-} + H_2O \rightarrow HO_2^- + 2SO_4^- + H^+ \quad (11)$$

$$S_2O_8^{2-} + RH \rightarrow R\cdot + HSO_4^- + SO_4^-\cdot \quad (12)$$

$$SO_4^-\cdot + OH^- \rightarrow \cdot OH + SO_4^{2-} \quad (13)$$

$$H_2O_2 + Fe^{+2} \text{ (Indigenous)} \rightarrow Fe^{+3} + OH^- + \cdot OH \quad (14)$$

$$H_2O_2 + Fe^0 \text{ (Added ZVI)} \rightarrow Fe^{+3} + OH^- + \cdot OH \quad (15)$$

$$Fe^{+3} + H_2O_2 \rightarrow Fe^{+2} + H^+ HO_2\cdot \quad (16)$$

$$S_2O_8 + Fe^0 \rightarrow Fe^{+3} + SO^{4-} + SO_4^-\cdot \quad (17)$$

(Direct oxidation of $NaS_2O_8$ and $H_2O_2$)

Attenuation Process:

Sulfate Residual:

After dissolved oxygen has been depleted in the treatment area, sulfate (by-product of the persulfate oxidation) may be used as an electron acceptor for anaerobic biodegradation. This process is termed sufanogenesis and results in the production of sulfide. Sulfate concentrations may be used as an indicator of anaerobic degradation of fuel compounds. Stoichiometrically, each 1.0 mg/L of sulfate consumed by microbes results in the destruction of approximately 0.21 mg/L of BTEX. Sulfate can play an important role in bioremediation of petroleum products, acting as an electron acceptor in co-metabolic processes as well. The basic reactions of the mineralization of benzene, toluene and xylenes under sulfate reduction are presented in equations (18), (19), and (20) respectively:

$$C_6H_6 + 3.75SO_4^{2-} + 3H_2O \rightarrow 0.37H^+ + 6HCO_3^- + 2.25HS^- + 2.25H_2S^- \quad (18)$$

$$C_7H_8 + 4.5SO_4^{2-} + 3H_2O \rightarrow 0.25H^+ + 7HCO_3^- + 1.87HS^- + 1.88H_2S^- \quad (19)$$

$$C_8H_{10} + 5.25SO_4^{2-} + 3H_2O \rightarrow 0.125H^+ + 8HCO_3^- + 2.625HS^- + 2.625H_2S^- \quad (20)$$

Ferrous Iron:

Ferric iron is also used as an electron acceptor during anaerobic biodegradation of many contaminants after sulfate depletion, or sometimes in conjunction with sulfate. During this process, ferric iron is reduced to ferrous iron, which is soluble in water. Ferrous iron may then be used as an indicator of anaerobic activity. As an example, stoichiometrically, the degradation of 1 mg/L of BTEX results in the production of approximately 21.8 mg/L of ferrous iron.

Ferrous iron formed as a result of the use of the ferric species as a terminal electron acceptor, under these same conditions the residual sulfate is utilized as a terminal electron acceptor by facultative organisms, generating sulfide. Together, the ferrous iron and the sulfide promote the formation of pyrite as a remedial byproduct. The mechanism described herein combats the toxic effects of sulfide and hydrogen sulfide accumulation on the facultative bacteria, while also providing a means of removing target organics through soil mineral (pyrite) suspension.

This technique utilizes the interaction between the occurring sulfate and ferric iron. Ferric iron ($Fe^{3+}$) is reduced to ferrous iron ($Fe^{2+}$); readily supplying electrons to exchange and react with sulfide as seen in equation (21). Together, sulfide and iron form pyrite, an iron bearing soil mineral with a favorable reductive capacity.

$$Fe^{2+} + 2S^{2-} \rightarrow FeS_2 \quad (21)$$

Pyrite possesses a finite number of reactive sites that are directly proportional to both its reductive capacity and the rate of decay for the target organics. Pyrite acts as a tertiary treatment mechanism under the reducing conditions of the environment. The reductive capacity of iron bearing soil minerals (like pyrite) initially results in a rapid removal of target organics by minimizing the competition between contaminants and sulfate as a terminal electron acceptor. Preventing these unfavorable interactions with ferric iron provides a continual source for electron exchange resulting in the timely removal of contaminants through pyrite suspension. Once the reductive capacity of pyrite is met, the bound organic contaminants tend to precipitate out, removing the contaminants rapidly and without the production of daughter products.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for chemical oxidation followed by a biological attenuation process of an environmental medium containing one or more contaminants, the method comprising,
introducing persulfate and one or more trivalent metals into the environmental medium, wherein the one or more trivalent metals activate the persulfate in order to chemically oxidize the one or more contaminants, wherein amount of the persulfate is selected to chemically oxidize the one or more contaminants and amount of the one or more trivalent metals is between approximately 17-30% of molecular weight of the persulfate so that at conclusion of the chemical oxidation sufficient residual sulfate and sufficient residual trivalent metals remain such that:
naturally occurring facultative cultures utilize the residual sulfate and the residual trivalent metal as terminal electron acceptors to promote the biological attenuation process of the one or more contaminants; and
the residual sulfate and the residual trivalent metal prevent formation and accumulation of hydrogen sulfide which is a toxin to the facultative cultures.

2. The method of claim 1, wherein the environmental medium is soil or groundwater.

3. The method of claim 1, wherein the persulfate is sodium, potassium, or ammonium based.

4. The method of claim 1, wherein the introducing one or more trivalent metals includes introducing one or more zero valent metals and hydrogen peroxide to generate the one or more trivalent metals.

5. The method of claim 1, wherein the one or more trivalent metals activate the persulfate so as to form sulfate free radicals.

6. The method of claim 1, wherein the one or more trivalent metals include $Fe^{3+}$.

7. The method of claim 1, wherein the one or more trivalent metals include $Mn^{3+}$.

8. The method of claim 1, wherein the biological attenuation process is accomplished as the environmental medium returns to a reducing condition.

9. The method of claim 1, wherein the biological attenuation process results in reduction of the residual sulfate and trivalent metals to sulfide and divalent metals.

10. The method of claim 9, wherein the sulfide and divalent metals combine and precipitate as reactive geological minerals including pyrite.

11. The method of claim 1, wherein the introducing one or more trivalent metals includes introducing the one or more trivalent metals via temporary or permanent wells.

12. The method of claim 1, wherein the introducing the persulfate includes introducing the persulfate via gravity feeding, induced gas stream, a pump, or a combination thereof.

13. The method of claim 1, wherein the introducing one or more trivalent metals includes introducing the one or more trivalent metals under pressure in either a gas or liquid stream.

14. The method of claim 1, wherein the introducing one or more trivalent metals includes introducing one or more divalent metals and hydrogen peroxide to generate the one or more trivalent metals.

15. A method for oxidizing and biologically attenuating contaminants in an environmental medium containing one or more contaminants, the method comprising;
introducing persulfate and one or more trivalent metals into the environmental medium, wherein the one or more trivalent metals activate the persulfate in order to cause oxidation of the one or more contaminants, which wherein the oxidation of the one or more contaminants provides residual material, and wherein an amount of the persulfate is selected to chemically oxidize the one or more contaminants and an amount of the one or more trivalent metals is between approximately 17-30% of molecular weight of the persulfate so as to produce sufficient residual material such that:
naturally occurring facultative cultures utilize the residual material as terminal electron acceptors to promote the biological attenuation process of the one or more contaminants; and
the residual material prevents formation and accumulation of a toxin to the facultative culture.

16. The method of claim 15, wherein the persulfate and the one or more trivalent metals are combined before introduction into the environmental medium.

17. The method of claim 15, wherein the persulfate and the one or more trivalent metals are introduced into the environmental medium sequentially.

18. The method of claim 15, wherein the residual material includes sulfate and trivalent metal.

19. The method of claim 18, wherein the biological attenuation process results in reduction of the residual sulfate and trivalent metals to sulfide and divalent metals.

20. The method of claim 19, wherein the sulfide and divalent metals combine and precipitate as reactive geological minerals including pyrite.

21. The method of claim 20, wherein the toxin includes sulfide and hydrogen sulfide and the pyrite results in the removal of potentially inhibitory levels of the sulfide and the hydrogen sulfide in the environmental medium.

22. The method of claim 20, wherein the pyrite provides for abiotic surface oxidation of the environmental medium, providing additional attenuation of the one or more contaminants.

23. The method of claim 15, wherein the introducing a persulfate and one or more trivalent metals into the environmental medium are done sequentially.

24. The method of claim 15, wherein the introducing a persulfate and one or more trivalent metals into the environmental medium are done concurrently.

25. The method of claim 1, wherein the introducing a persulfate and one or more trivalent metals into the environmental medium are done sequentially.

26. The method of claim 1, wherein the introducing a persulfate and one or more trivalent metals into the environmental medium are done concurrently.

* * * * *